(12) United States Patent
Wilhelm (10) Patent No.: US 11,480,264 B2
(45) Date of Patent: *Oct. 25, 2022

(54) FLUID HANDLING COUPLING BODY WITH LATCH

(71) Applicant: Colder Products Company, Roseville, MN (US)

(72) Inventor: Grant A. Wilhelm, Plymouth, MN (US)

(73) Assignee: Colder Products Company, Roseville, MN (US)

(*) Notice: Subject to any disclaimer, the term of this patent is extended or adjusted under 35 U.S.C. 154(b) by 93 days.

This patent is subject to a terminal disclaimer.

(21) Appl. No.: 17/222,240

(22) Filed: Apr. 5, 2021

(65) Prior Publication Data

US 2021/0222793 A1 Jul. 22, 2021

Related U.S. Application Data (63) Continuation of application No. 16/511,156, filed on Jul. 15, 2019, now Pat. No. 10,975,982.

(60) Provisional application No. 62/712,092, filed on Jul. 30, 2018.

(51) Int. Cl.
*F16K 35/02* (2006.01)
*F16D 39/00* (2006.01)
*F16L 37/084* (2006.01)
*F16L 37/42* (2006.01)

(52) U.S. Cl.
CPC ............ *F16K 35/025* (2013.01); *F16D 39/00* (2013.01); *F16L 37/0841* (2013.01); *F16L 37/42* (2013.01)

(58) Field of Classification Search
CPC .................................................. F16L 37/0841
USPC ........................................ 251/149.6; 285/317
See application file for complete search history.

(56) References Cited

U.S. PATENT DOCUMENTS

| | | | | |
|---|---|---|---|---|
| 738,503 A ‡ | 9/1903 | Waters | ................. | F16L 37/088 285/321 |
| 3,718,350 A ‡ | 2/1973 | Klein | ................. | F16L 37/0885 285/39 |
| 4,105,226 A ‡ | 8/1978 | Frey | ..................... | B60T 17/043 285/148.21 |

(Continued)

FOREIGN PATENT DOCUMENTS

| CN | 103975186 | 8/2014 |
|---|---|---|
| CN | 104455825 | 3/2015 |

(Continued)

OTHER PUBLICATIONS

PCI International Search Report and Written Opinion in PCT Appln. No. PCT/US2019/041770, dated Sep. 1, 2019, 7 pages.‡

(Continued)

*Primary Examiner* — Robert K Arundale
(74) *Attorney, Agent, or Firm* — Fish & Richardson P.C.

(57) ABSTRACT

Fluid handling couplings can be made to connect and disconnect other members of a fluid handling system. For example, this document describes fluid couplings that are convenient to couple/decouple and that provide strong resistance to inadvertent disconnection when subjected to rotation while pressurized. In some embodiments, the resistance to inadvertent disconnection is facilitated by a latch mechanism of the female coupling that includes a protrusion that becomes seated in a groove of a mated male coupling.

19 Claims, 11 Drawing Sheets

(56) References Cited

U.S. PATENT DOCUMENTS

| | | | | |
|---|---|---|---|---|
| 4,603,886 | A ‡ | 8/1986 | Pallini, Jr. | F16L 37/088 285/24 |
| 4,934,655 | A ‡ | 6/1990 | Blenkush | F16L 37/42 251/149 |
| 5,033,777 | A ‡ | 7/1991 | Blenkush | F16L 37/0841 285/317 |
| 5,052,725 | A ‡ | 10/1991 | Meyer | F16L 37/0841 285/308 |
| 5,074,601 | A ‡ | 12/1991 | Spors | F16L 37/12 285/308 |
| 5,104,158 | A ‡ | 4/1992 | Meyer | F16L 37/0841 285/308 |
| 5,494,074 | A ‡ | 2/1996 | Ramacier, Jr. | F16L 37/0841 137/614.04 |
| 5,806,832 | A ‡ | 9/1998 | Larbuisson | F16L 37/42 251/149.6 |
| 5,845,943 | A ‡ | 12/1998 | Ramacier, Jr. | F16L 37/42 285/12 |
| 6,024,124 | A | 2/2000 | Braun | |
| 6,231,089 | B1 ‡ | 5/2001 | DeCler | F16L 37/0841 285/308 |
| 7,611,171 | B2 ‡ | 11/2009 | Yoshino | F16L 23/0283 285/1 |
| 7,828,336 | B2 ‡ | 11/2010 | Gammons | F16L 37/0841 285/317 |
| 8,087,451 | B2 ‡ | 1/2012 | Gammons | F16L 37/0841 165/46 |
| 9,671,051 | B2 ‡ | 6/2017 | Frick | F16L 37/0841 |
| 9,689,516 | B2 ‡ | 6/2017 | Frick | F16L 37/0841 |
| 2005/0001425 | A1 ‡ | 1/2005 | deCler | F16L 37/34 285/305 |
| 2005/0057042 | A1 ‡ | 3/2005 | Wicks | F16L 37/0841 285/305 |
| 2008/0296888 | A1 ‡ | 12/2008 | Blivet | F16L 47/02 285/21.1 |
| 2009/0194722 | A1 ‡ | 8/2009 | Tiberghien | F16L 37/0841 251/149.6 |
| 2013/0092271 | A1 ‡ | 4/2013 | Downs | F16L 37/35 137/798 |

FOREIGN PATENT DOCUMENTS

| | | |
|---|---|---|
| CN | 105637277 | 6/2016 |
| CN | 105782616 | 7/2016 |
| EP | 2245354 | 11/2010 |
| JP | H08114290 | 5/1996 |
| WO | WO 2009/097327 | 8/2009 |

OTHER PUBLICATIONS

PCT International Search Report and Written Opinion in PCT Appln. No. PCT/US2019/041770, dated Sep. 18, 2019, 7 pages.

Extended European Search Report in European Appln No. 19844461.4, dated Aug. 2, 2021, 7 pages.

‡ imported from a related application

FLUID HANDLING COUPLING BODY WITH LATCH

CROSS-REFERENCE TO RELATED APPLICATIONS

This application is a continuation of U.S. application Ser. No. 16/511,156, filed on Jul. 15, 2019, which claims priority to U.S. Application Ser. No. 62/712,092, filed on Jul. 30, 2018. The disclosure of the prior application is considered part of the disclosure of this application, and is incorporated in its entirety into this application.

TECHNICAL FIELD

This document relates to fluid handling couplings. For example, this document relates to fluid couplings that are convenient to couple/decouple and that provide strong resistance to inadvertent disconnection when subjected to rotation while pressurized.

BACKGROUND

Fluid handling components such as fluid couplings allow fluid communication between two or more components. Some fluid couplings include features that allow male and female components to be quickly connected or disconnected, and may include one or more internal valve components that selectively block or allow flow of fluid through the coupling.

SUMMARY

This document describes fluid handling couplings. For example, this document describes fluid couplings that are convenient to couple/decouple and that provide strong resistance to inadvertent disconnection when subjected to rotation while pressurized. In some embodiments, the resistance to inadvertent disconnection is facilitated by a latch mechanism of the female coupling that includes a protrusion that becomes seated in a groove of a mated male coupling.

In one aspect, this disclosure is directed to a female fluid coupling that includes a coupling body defining a central longitudinal axis and an interior space for receiving a mating male coupling. An outer portion of the interior space has an oval cross-sectional shape. An inner portion of the interior space is cylindrical. A latch mechanism coupled to the body is movable, transversely relative to the central longitudinal axis, between a latched position and an unlatched position. A portion of the latch mechanism intersects the outer portion of the interior space while the latch mechanism is in the latched position.

Such a female fluid coupling may optionally include one or more of the following features. A center of the oval cross-sectional shape of the outer portion of the interior space may be offset from the central longitudinal axis. The central longitudinal axis may be coincident with a center axis of the cylindrical inner portion of the interior space. The oval cross-sectional shape may be an ellipse. The oval cross-sectional shape may be egg-shaped. The oval cross-sectional shape may be an oblong circle. The latch mechanism may be movable between the latched and unlatched positions along a same transverse direction as which a long axis of the oval cross-sectional shape of the outer portion extends. The coupling body may also define a transition portion of the interior space located between the outer portion and the inner portion. The transition portion may include a surface that extends at a non-zero angle relative to the central longitudinal axis. The non-zero angle may be between 30 degrees and 60 degrees. The portion of the latch mechanism that intersects with the outer portion of the interior space while the latch mechanism is in the latched position may be positioned on an opposite side of the outer portion in comparison to where the surface that extends at the non-zero angle relative to the central longitudinal axis meets the outer portion. The portion of the latch mechanism that intersects the outer portion of the interior space while the latch mechanism is in the latched position may comprise a protrusion. In some embodiments, the protrusion does not extend into the interior space while the latch mechanism is in the unlatched position. A long axis of the oval cross-sectional shape of the outer portion may intersect the protrusion. The protrusion may comprise plastic material. An entirety of the latch mechanism may be the plastic material. The fluid coupling may also include a valve disposed within the interior space. The valve may be movable along the central longitudinal axis between an open configuration in which fluid can flow through the female fluid coupling and a closed configuration in which fluid cannot flow through the female fluid coupling.

In another aspect, this disclosure is directed to a fluid coupling system including a male coupling defining a central longitudinal axis and a female coupling that includes a coupling body defining a central longitudinal axis and an interior space for receiving an end portion of the male coupling. An outer portion of the interior space has an oval cross-sectional shape. An inner portion of the interior space is cylindrical. A latch mechanism coupled to the body is movable, transversely relative to the central longitudinal axis, between a latched position and an unlatched position. A portion of the latch mechanism intersects the outer portion of the interior space while the latch mechanism is in the latched position. The end portion of the male coupling can be inserted into the outer portion of the interior space while the latch mechanism is in the latched position.

Such a fluid coupling system may optionally include one or more of the following features. Farther insertion of the end portion into the interior space may drive the portion of the latch mechanism out of the interior space and drive the latch mechanism toward the unlatched position. The central longitudinal axes of the male coupling and the coupling body of the female coupling may be spaced apart from each other when the end portion of the male coupling is inserted into the outer portion of the interior space while the latch mechanism is in the latched position. The central longitudinal axes of the male coupling and the coupling body of the female coupling may be coincident with each other when the male and female couplings are fully coupled together.

Some embodiments of the devices, systems and techniques described herein may provide one or more of the following advantages. First, the fluid couplings described herein are convenient to couple together. For example, the male coupling may simply be pushed into engagement with the female coupling and the two will be automatically locked together. Second, the fluid couplings described herein are convenient to decouple from each other. For example, a latch component of the female coupling may simply be depressed and the male and female couplings can then be separated from each other. Third, the fluid couplings described herein are designed to provide resistance to inadvertent disconnection when subjected to rotation while pressurized. Fourth, the fluid couplings described herein are economical to manufacture. For example, in some embodiments the fluid couplings described herein are made almost entirely of injection molded thermoplastic components. Fifth, the female couplings described herein are compatible with male couplings in the field. Accordingly, the improved female couplings described herein can be readily adopted in place of many existing female couplings.

The details of one or more implementations are set forth in the accompanying drawings and the description below. Other features and advantages will be apparent from the description and drawings, and from the claims.

BRIEF DESCRIPTION OF DRAWINGS

The present description is further provided with reference to the appended Figures, wherein like structure is referred to by like numerals throughout the several views, and wherein.

DETAILED DESCRIPTION OF ILLUSTRATIVE EMBODIMENTS

Figure 1:
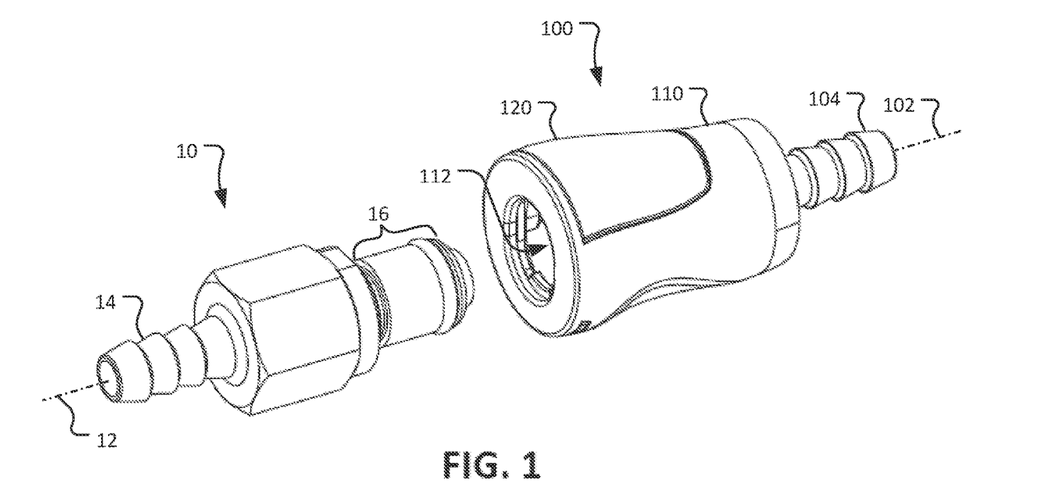
FIG. 1 is a perspective view of an example male coupling and an example female coupling in a disconnected state.
Figure 2:
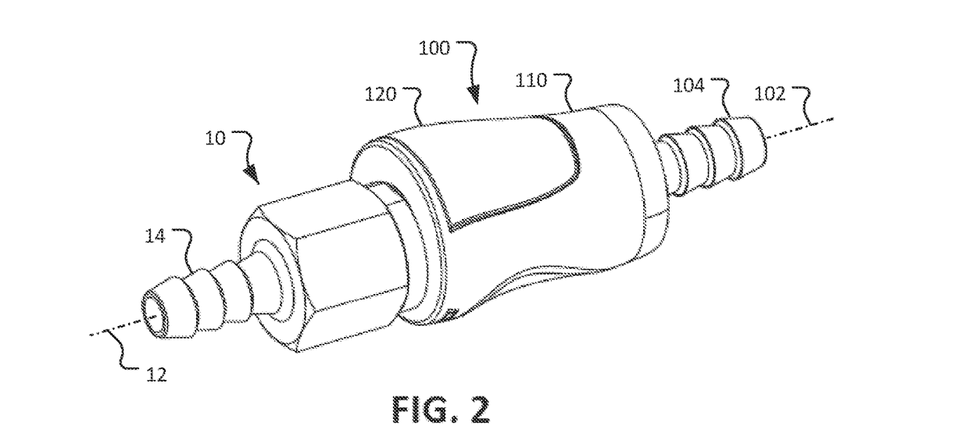
FIG. 2 is a perspective view of the male and female couplings of FIG. 1 in a coupled state.

Referring to FIG. 1, a fluid coupling system includes a male coupling 10 and a female coupling 100. The male coupling 10 and female coupling 100 can be releasably coupled with each other as depicted in FIG. 2 to create fluid communication between a male coupling termination 14 and a female coupling termination 104. In the coupled arrangement, the male coupling 10 and female coupling 100 are mechanically latched or detained in relation to each other. Thereafter, the male coupling 10 and female coupling 100 can be uncoupled from each other by depressing a latch mechanism 120. In some embodiments, when the male coupling 10 and female coupling 100 are uncoupled from each other, valves inside of the male coupling 10 and female coupling 100 close to prevent fluid from flowing out of the male coupling 10 and female coupling 100.

While the terminations 14 and 104 are depicted as barbed fittings, any type of fluid connection can be used. For example, the terminations 14 and/or 104 can be, but not limited to, a compression fitting, a press-in fitting, a luer fitting, a threaded fitting (internal or external), a sanitary fitting, a pigtail, a T-fitting, a Y-fitting, and any other suitable type of configuration such that the male coupling 10 and female coupling 100 are configured for connection to a fluid system as desired. In some embodiments, the male coupling 10 and/or female coupling 100 may be supplied with a removable cap (not shown), or another type of component, that is releasably coupled with the terminations 14 and/or 104.

The materials from which one or more of the components of the male coupling 10 and/or female coupling 100 are made of include thermoplastics. In particular embodiments, the materials from which the components of the male coupling 10 and/or female coupling 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the materials from which one or more of the components of the male coupling 10 and/or female coupling 100 are made of include metals such as, but not limited to stainless steel, brass, aluminum, plated steel, and the like. In particular embodiments, the male coupling 10 and/or female coupling 100 is/are metallic-free. In some embodiments the male coupling 10 and/or female coupling 100 include one or more metallic spring members (e.g., spring steel, stainless steel, and the like). In certain embodiments, male coupling 10 and/or female coupling 100 include one or more seals that are made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like.

The female coupling 100 includes a coupling body 110 that defines a central longitudinal axis 102 and an interior space 112 for receiving an end portion 16 of the male coupling 10. The male coupling 10 defines a central longitudinal axis 12. As described further below, when the male coupling 10 and female coupling 100 are fully coupled together (FIG. 2), the central longitudinal axis 12 of the male coupling 10 and the central longitudinal axis 102 of the female coupling 100 are coincident and collinear with each other. However, during the process of coupling the male coupling 10 with the female coupling 100 (e.g., while the end portion 16 is being inserted into the interior space 112), the central longitudinal axis 12 of the male coupling 10 and the central longitudinal axis 102 of the female coupling 100 are spaced apart from each other.

Figure 3:
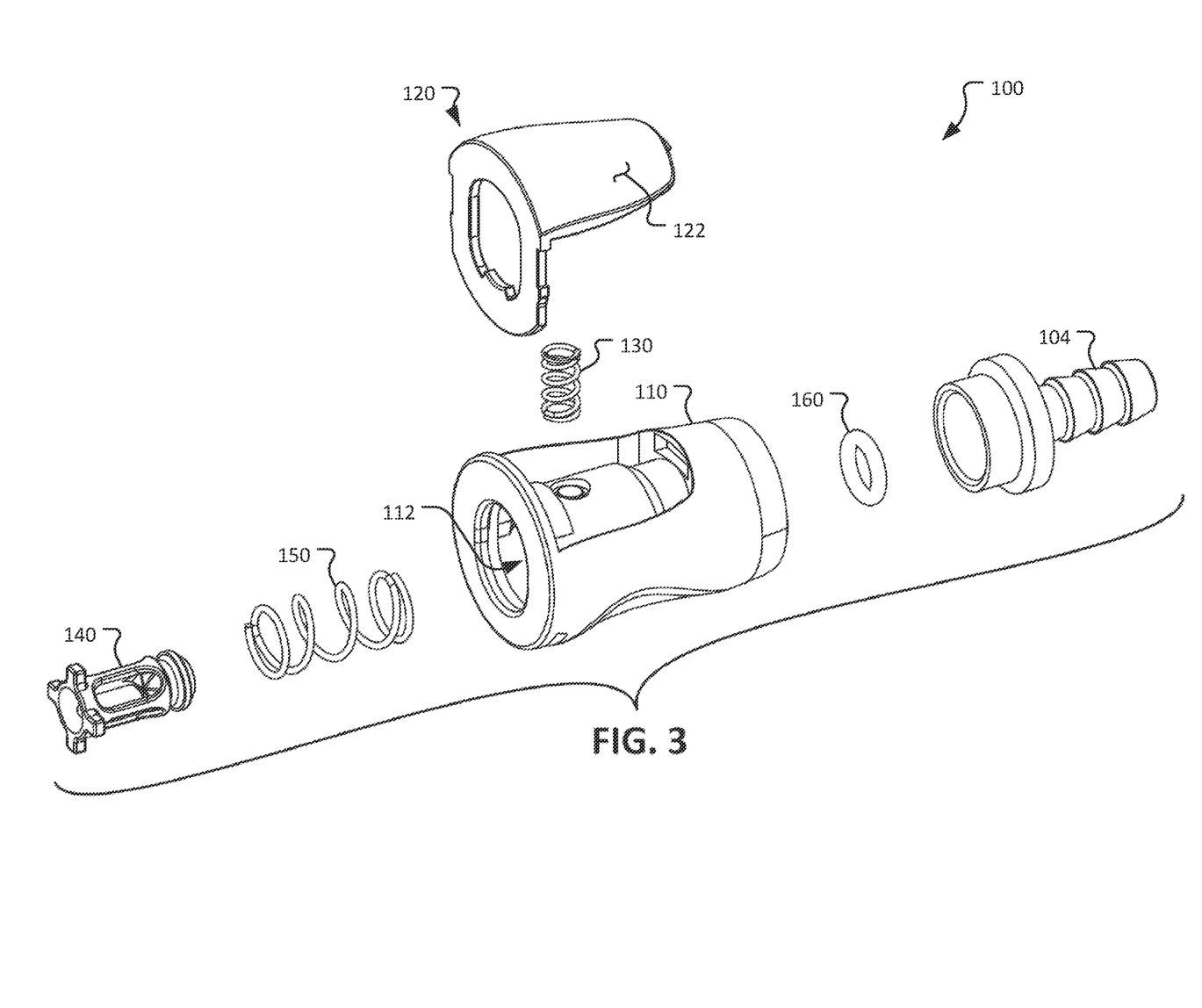
FIG. 3 is an exploded perspective view of the female coupling of FIG. 1.

Referring to FIG. 3, an example embodiment of the female coupling 100 is depicted in an exploded view. The female coupling 100 includes the termination 104, the coupling body 110, the latch mechanism 120, a latch spring 130, a valve member 140, a valve spring 150, and a valve seal 160. The termination 104 is attached to the coupling body 110 and extends along the central longitudinal axis 102.

The latch mechanism 120 is movably coupled to the coupling body 110. For example, as described further below, in the depicted embodiment the latch mechanism 120 is transversely movable relative to the central longitudinal axis 102 of the coupling body 110 between a latched position and an unlatched position. For example, the latch mechanism 120 can be moved to the unlatched position when a tab 122 of the latch mechanism 120 is manually depressed by a user.

The latch spring 130 is disposed between the latch mechanism 120 and the coupling body 110. Accordingly, the latch spring 130 biases the latch mechanism 120 toward the latched position. When a user of the female coupling 100 manually depresses the latch mechanism 120 toward the unlatched position, the latch spring 130 resists the manual force applied by the user. However, the user can readily overcome the resistance of the latch spring 130 in order to move the latch mechanism 120 fully to the unlatched position.

The valve spring 150 and the valve seal 160 are coupled to the valve member 140, and the valve assembly 140/150/160 is movably coupled to the coupling body 110. As described further below, the valve spring 150 biases the valve member 140 and valve seal 160 to a closed position in which fluid flow through the coupling body 110 is blocked. When the male coupling 10 is fully coupled with the female coupling 100 (e.g., FIG. 2), the end portion 16 of the male coupling 10 displaces the valve member 140 relative to the coupling body 110 into an open position in which an open fluid flow path through the coupling body 110 is established.

Figure 4:
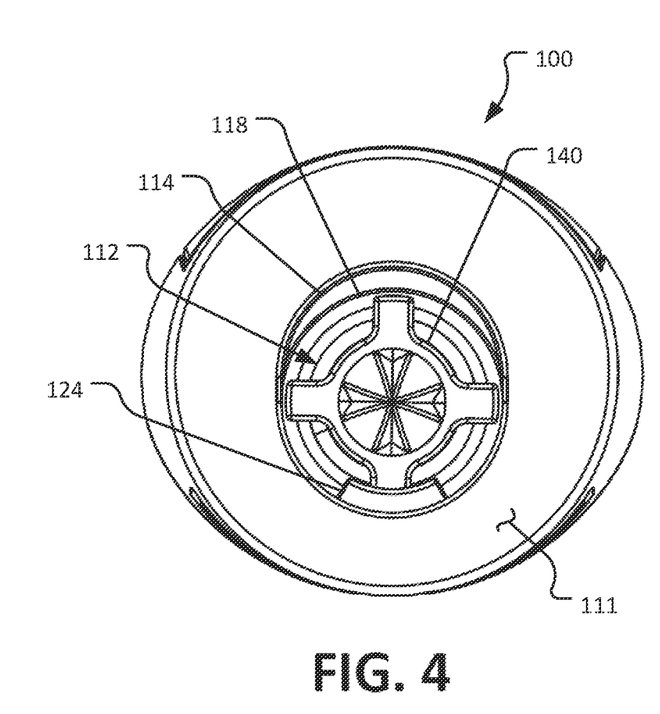
FIG. 4 is an end (face) view of the female coupling of FIG. 1.
Figure 5:
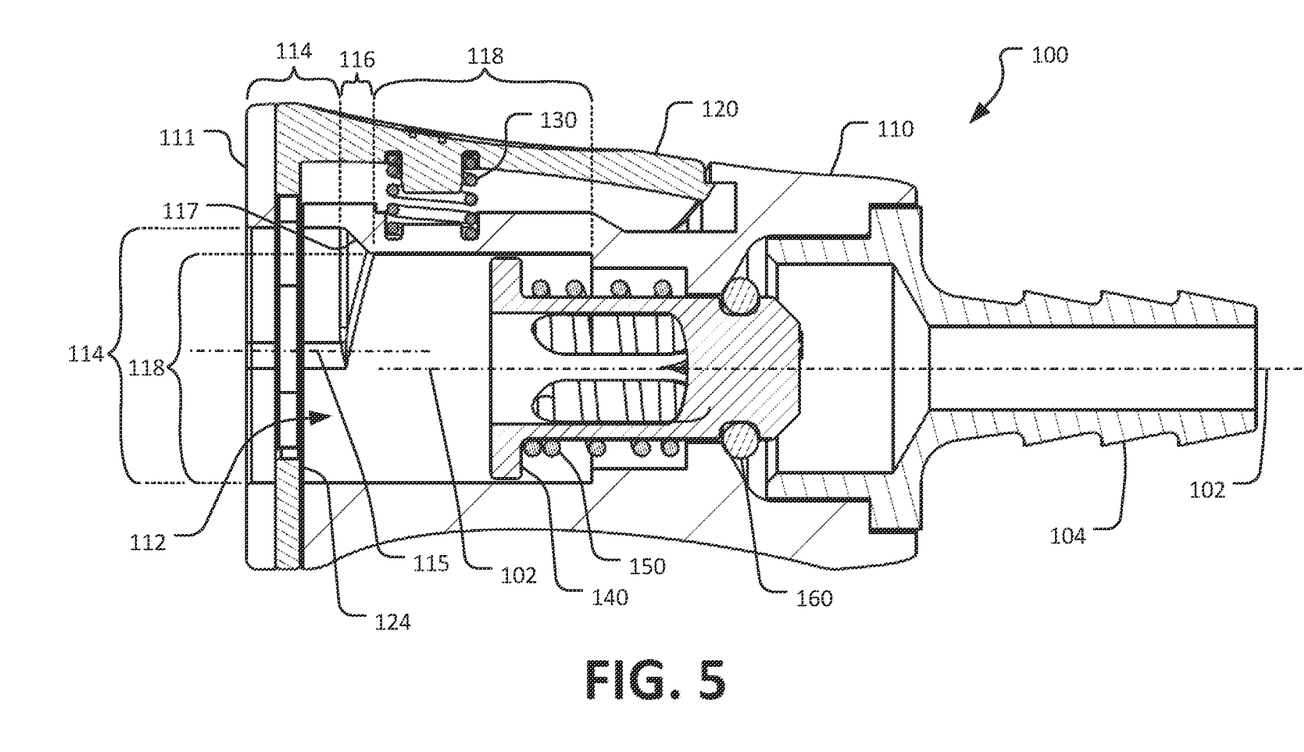
FIG. 5 is a longitudinal cross-sectional view of the female coupling of FIG. 1.
Figure 6:
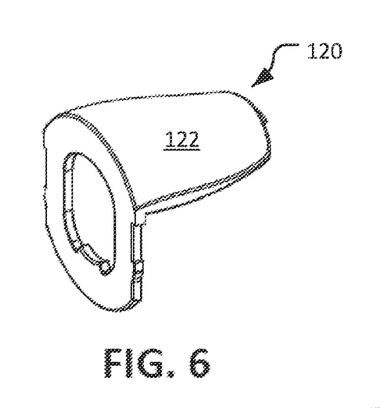
FIGS. 6-11 are various views of a latch mechanism that can be used as part of the female coupling of FIG. 1.
Figure 7:
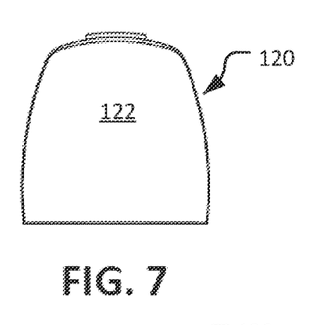
Figure 8:
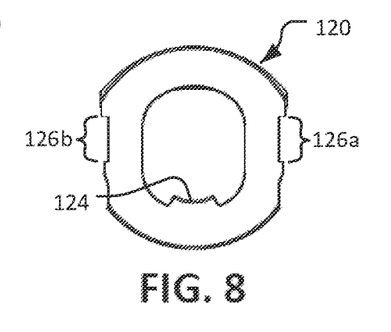
Figure 9:
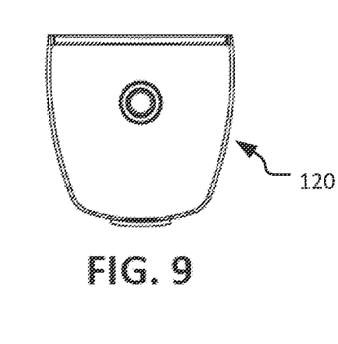
Figure 10:
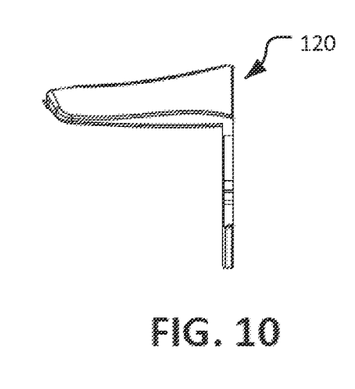
Figure 11:
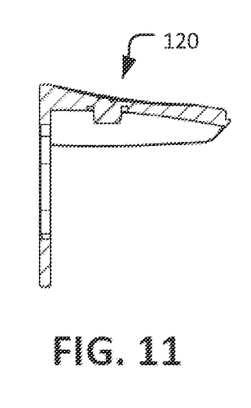
Figures 12, 13, 14, 16:
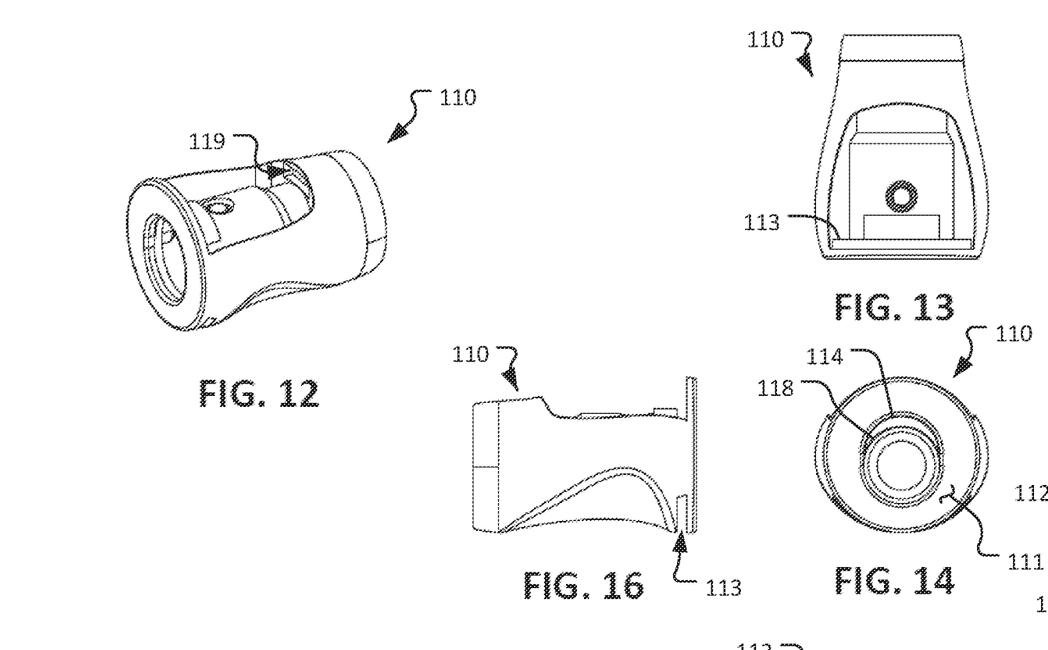
FIGS. 12-17 are various views of a coupling body that can be used as part of the female coupling of FIG. 1.
Figure 15:
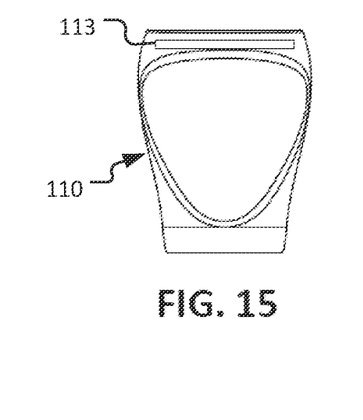
Figure 17:
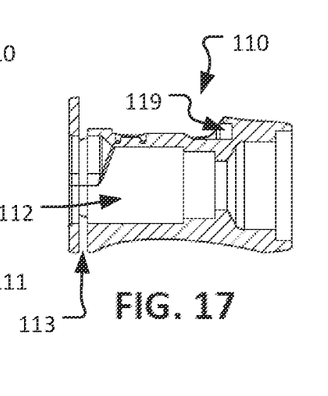

Referring to FIGS. 4 and 5, the female coupling 100 is shown in an end view and longitudinal cross-sectional view respectively. The latch mechanism 120 is shown in the latched position. The configuration of the interior space 112 is visible in these views. In particular, the interior space 112 includes an outer portion 114, a transition portion 116, and inner portion 118. The transition portion 116 is disposed between the outer portion 114 and the inner portion 118.

In the depicted embodiment, the outer portion 114 (which begins at an end face 111 of the female coupling 100) has an oval cross-sectional shape (e.g., as seen in FIG. 4). In some embodiments, the oval cross-sectional shape is an ellipse, is egg-shaped, is an oblong circle, and the like. A central axis 115 of the oval cross-sectional shape of the outer portion 114 is offset from the central longitudinal axis 102 of the coupling body 110.

In the depicted embodiment, the inner portion 118 is cylindrical. That is, the inner portion 118 has a circular cross-sectional shape. A central axis of the cylindrical inner portion 118 is coincident with the central longitudinal axis 102 of the coupling body 110.

In the depicted embodiment, the transition portion 116 includes a contoured beveled surface 117 that extends between the outer portion 114 and the inner portion 118 at a non-zero angle relative to the central longitudinal axis 102. In some embodiments, the non-zero angle of the beveled surface 117 relative to the central longitudinal axis 102 is between 40 degrees and 50 degrees, between 30 degrees and 60 degrees, between 20 degrees and 70 degrees, between 40 degrees and 60 degrees, or between 30 degrees and 50 degrees, without limitation.

A portion of the latch mechanism 120 intersects the outer portion 114 of the interior space 112 while the latch mechanism 120 is in the latched position (as shown). In the depicted embodiment, a latch protrusion 124 of the latch mechanism 120 intersects the outer portion 114 of the interior space 112 while the latch mechanism 120 is in the latched position. When the latch mechanism 120 is in the unlatched position, the latch protrusion 124 does not extend into the outer portion 114 of the interior space 112. The latch protrusion 120 is on an opposite side of the outer portion 114 in comparison to the beveled surface 117 of the transition portion 116. In some embodiments, the latch protrusion 124 is an arcuate member with edges that extend along radial paths from the center of the female coupling 100. In some embodiments, the arc length of the latch protrusion 124 is between 55 degrees and 65 degrees, between 50 degrees and 70 degrees, or between 40 degrees and 80 degrees.

It can be seen (e.g., refer to FIG. 4) that the latch protrusion 124 is intersected by the long axis of the oval cross-sectional shape of the outer portion 114. In some embodiments, the latch protrusion 124 is centered on the long axis of the oval cross-sectional shape of the outer portion 114. The latch mechanism 120 is movable between the latched and unlatched positions along a same direction (transverse to the central longitudinal axis 102) as which a long axis of the oval cross-sectional shape of the outer portion 114 extends.

FIGS. 6 through 11 show various views of the example latch mechanism 120. The latch mechanism 120 includes the tab 122 and the latch protrusion 124. The latch mechanism 120 also defines a first side recess 126a and a second side recess 126b. As described further below, the first and second side recesses 126a-b cooperate with the coupling body 110 to movably couple the latch mechanism 120 to the coupling body 110.

FIGS. 12 through 17 show various views of the example coupling body 110. The coupling body 110 defines a slot 113 in which the latch mechanism 120 movably resides such that the latch mechanism 120 is movable between the latched and unlatched configurations. The slot 113 extends perpendicularly to the central longitudinal axis 102 of the coupling body 110. The coupling body 110 also defines a recess 119 into which the tab 122 extends.

Figure 18:
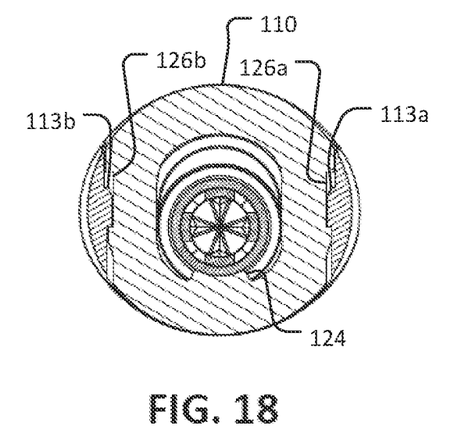
FIGS. 18 and 19 illustrate how the latch mechanism of FIGS. 6-11 and coupling body of FIGS. 12-17 can be movably coupled to each other.
Figure 19:
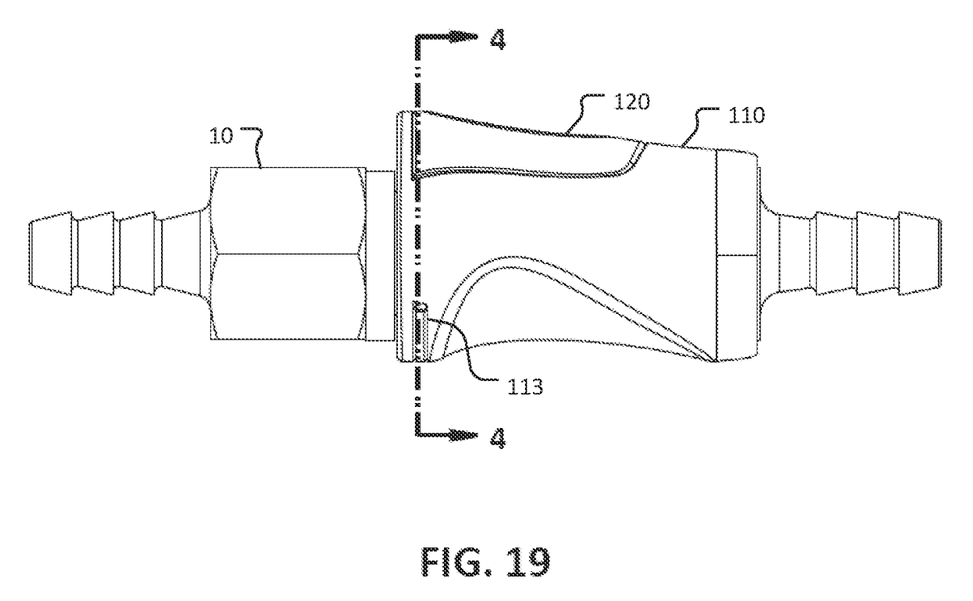

FIGS. 18 and 19 further illustrate how the latch mechanism 120 is movably coupled to the coupling body 110. Here, a transverse cross-section view through the slot 113 reveals that the coupling body 110 includes a first projection 113a and a second projection 113b that are respectively positioned in the first side recess 126a and the second side recess 126b of the latch mechanism 120. Since the lateral dimensions of the projections 113a-b are less than the lateral length of the recesses 126a-b, the latch mechanism 120 is transversely movable relative to the coupling body 110. In particular, the latch mechanism 120 is transversely movable relative to the coupling body 110 such that the latch protrusion 124 is positionable between: (i) the latched position in which the latch protrusion 124 extends into and intersects the outer portion 114 of the interior space 112 and (ii) the unlatched position in which the latch protrusion 124 does not extend into the outer portion 114 of the interior space 112.

Figure 23:
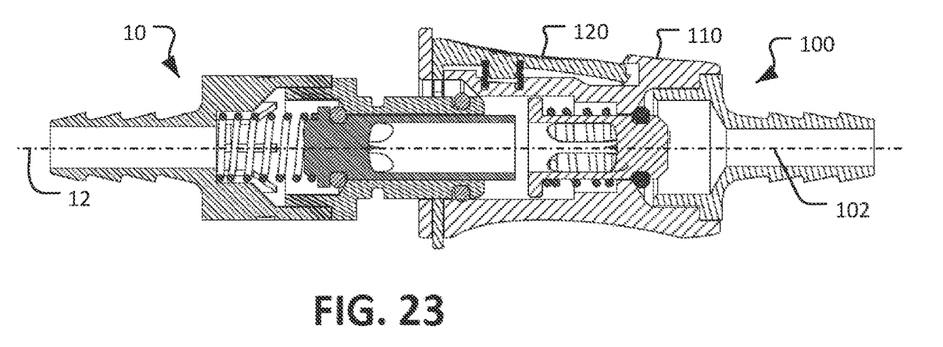
Figure 24:
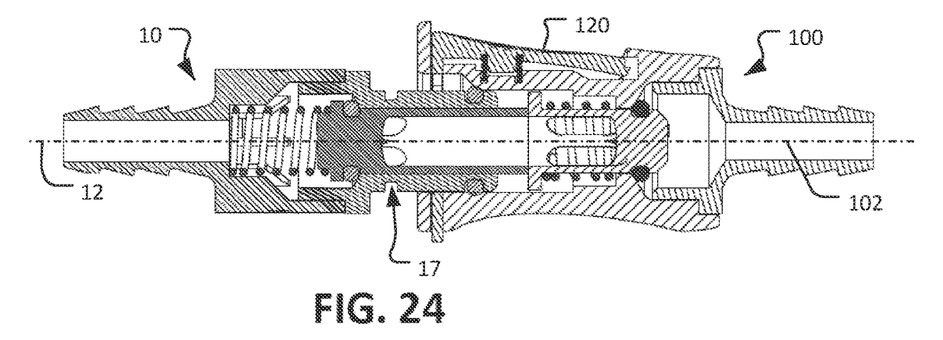
Figure 25:
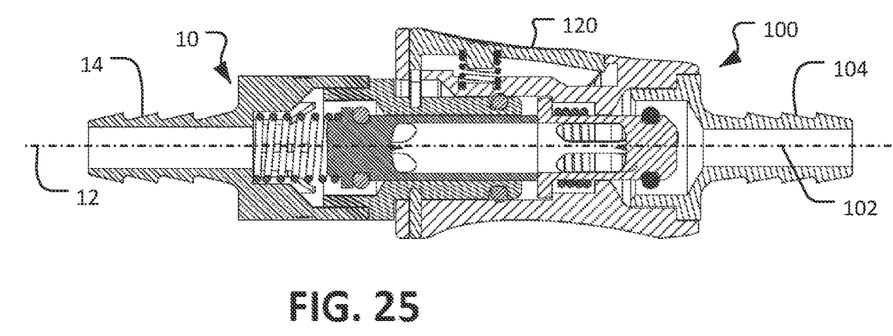

FIGS. 20 through 25 are a sequence of longitudinal cross-sectional views of the male coupling 10 and the female coupling 100 in the process of becoming coupled together. When the male coupling 10 and female coupling 100 are fully coupled and the latch mechanism 120 is in the latched position (as depicted in FIG. 25), the coupling system 10 and 100 can be uncoupled by manually depressing the latch mechanism 120 and then separating the male coupling 10 and the female coupling 100 as depicted by FIGS. 20 through 25 in reverse order.

Figure 20:
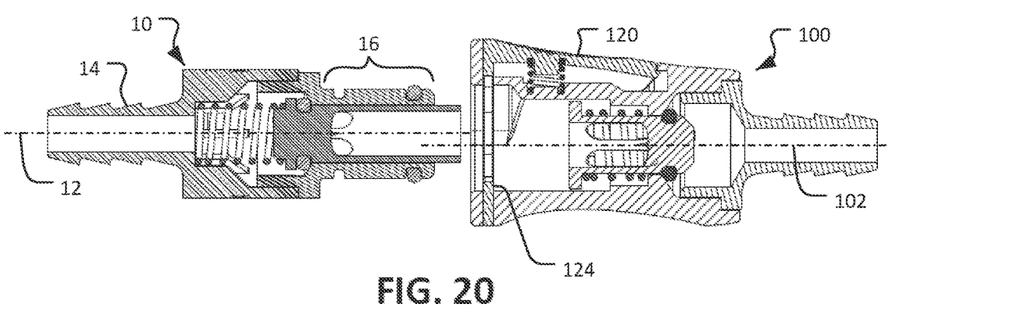
FIGS. 20-25 are a sequence of longitudinal cross-sectional views of the male coupling of FIG. 1 and the female coupling of FIG. 1 in the process of becoming coupled together.
Figure 21:
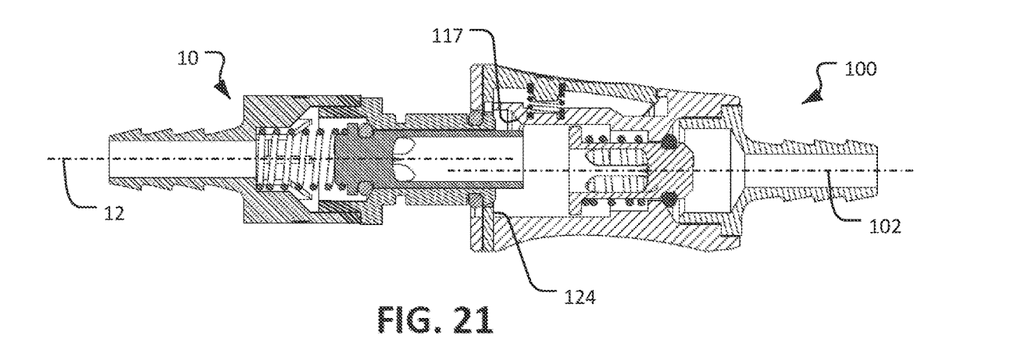
Figure 22:
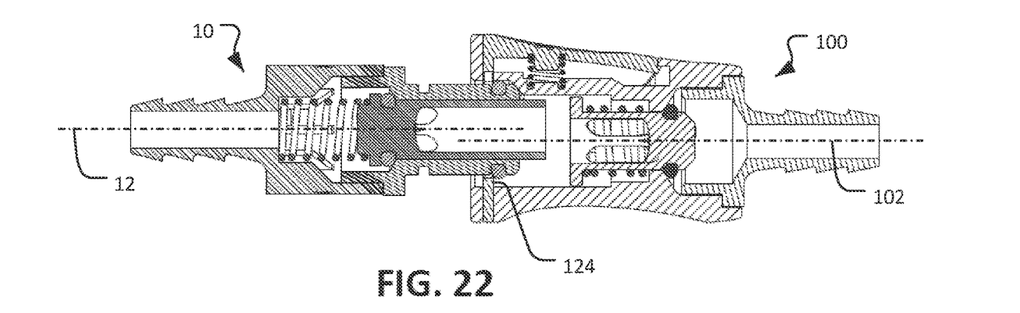

As shown in FIGS. 20 through 22, the end portion 16 of the male coupling 10 can be inserted into the outer portion 114 (refer to FIGS. 4 and 5) while the latch mechanism 120 is in the latched position. In those depicted arrangements, the central longitudinal axis 12 of the male coupling 10 is spaced apart from the central longitudinal axis 102 of the female coupling 110. The position of the latch protrusion 124 extending within the outer portion 114 of the interior space 112 physically causes the central longitudinal axis 12 of the male coupling 10 to be spaced apart from the central longitudinal axis 102 of the female coupling 110 during the initial insertion process (e.g., refer to FIG. 21).

As depicted by a comparison of FIGS. 22 and 23, when the end portion 16 of the male coupling 10 enters the transition portion 116 (refer to FIGS. 4 and 5) and makes contact with the beveled surface 117, continuing the insertion movement will cause the male coupling 10 to move transversely in relation to the female coupling 100 such that the central longitudinal axis 12 of the male coupling 10 will move into alignment with the central longitudinal axis 102 of the female coupling 110. The transverse movement of the male coupling 10 relative to the female coupling 100 is facilitated by the fact that the beveled surface 117 extends at a non-zero in relation to the central longitudinal axis 102 of the female coupling 110. The end portion 16 of the male coupling 10 rides along the beveled surface 117, and in doing so moves longitudinally and transversely in relation to the female coupling 100. Moreover, because the side of the end portion 16 that is opposite of the beveled surface 117 is adjacent to the latch protrusion 124 of the latch 120, the continued insertion applies transverse forces from the end portion 16 to the latch protrusion 124 that cause the latch 120 to move transversely toward the unlatched position. For example, while the latch mechanism 120 is in the latched position in FIG. 22, the latch mechanism 120 is in the unlatched position in FIG. 23. The transverse movement of the end portion 16 of the male coupling 10 drives the latch mechanism 120 to move toward the unlatched position in which the latch protrusion 124 does not extend into the outer portion 114 of the interior space 112.

Now, with the central longitudinal axis 12 of the male coupling 10 aligned with the central longitudinal axis 102 of the female coupling 110 (as depicted by FIG. 23), continuing the insertion movement will cause the end portion 16 of the male coupling 10 to enter into the inner portion 118 of the interior space 112 (as depicted by FIG. 24). Still further insertion will finally cause (as depicted by FIG. 25): (i) the latch protrusion 124 to engage within an annular latch groove 17 defined by the end portion 16 of the male coupling 10, and (ii) the valves within the male coupling 10 and female coupling 110 to open such that an open fluid flow path is created between the terminations 14 and 104. With the latch protrusion 124 engaged within the annular latch groove 17, the male coupling 10 and female coupling 100 will be releasably latched together until a manual force depresses the tab 122 of the latch mechanism 120 a sufficient transverse distance to disengage the latch protrusion 124 out of the annular latch groove 17.

Optional Features and Additional Embodiments

Figure 26:
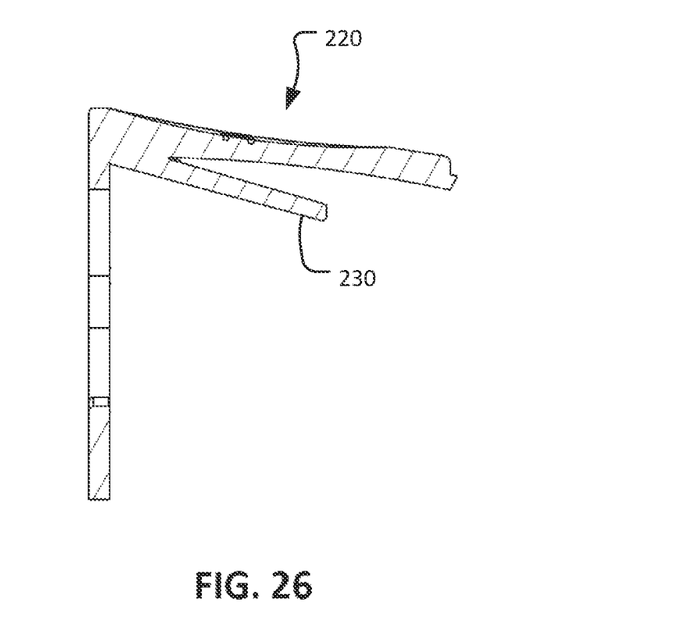
FIGS. 26 and 27 illustrate an alternative latch mechanism.
Figure 27:
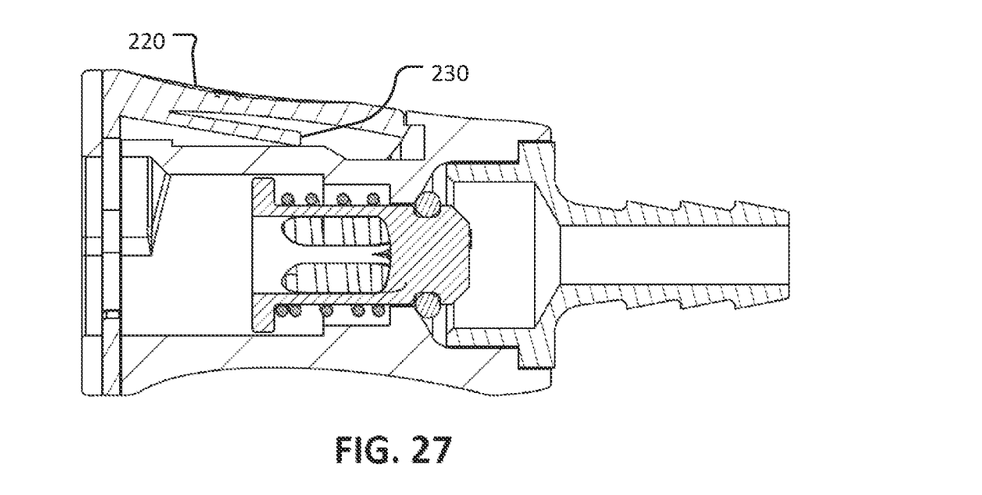
Figure 28:
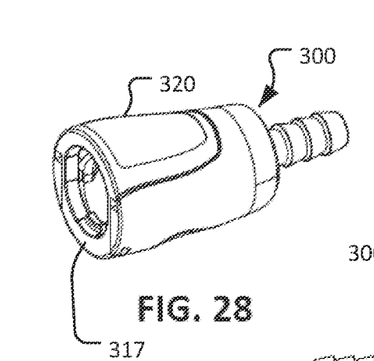
FIGS. 28-33 illustrate an alternative female coupling.
Figure 29:
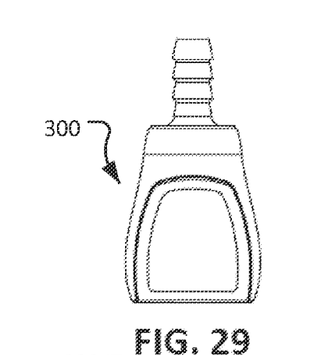
Figure 30:
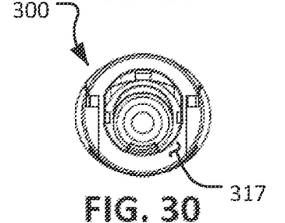
Figure 31:
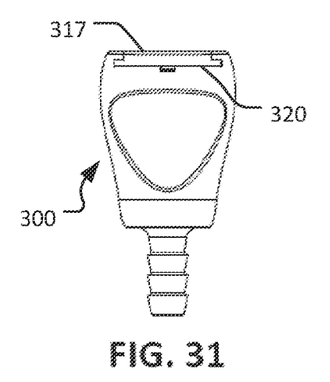
Figure 32:
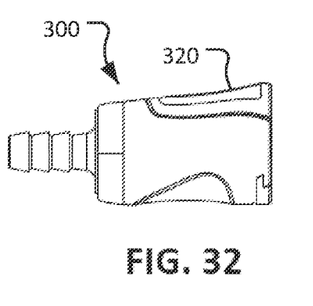
Figure 33:
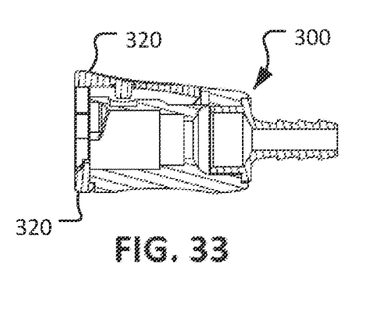

FIGS. 26 and 27 show an alternative design of a latch mechanism. In the depicted embodiment, the latch mechanism 220 includes a cantilevered leaf spring 230 that provides biasing toward the latched position as a substitute for the latch spring 130 (refer to FIG. 3). The depicted design using the leaf spring 230 can provide an economical design in that the latch mechanism 220 can be integrally molded, thereby eliminating the need for a separate spring and assembly process.

FIGS. 28 through 33 show an alternative design of a female coupling. In the depicted embodiment of the female coupling 300, the latch mechanism 320 forms at least a portion of the end face 317.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A female fluid coupling, comprising: a coupling body defining a central longitudinal axis and an interior space for receiving a mating male coupling, an outer portion of the interior space having an oval cross-sectional shape; and a latch mechanism coupled to the body, the latch mechanism movable between a latched position and an unlatched position, a portion of the latch mechanism intersecting the outer portion of the interior space while the latch mechanism is in the latched position; wherein a center of the oval cross-sectional shape of the outer portion of the interior space is offset from the central longitudinal axis.

2. The female fluid coupling of claim 1, wherein the central longitudinal axis is coincident with a center axis of a cylindrical inner portion of the interior space.

3. The female fluid coupling of claim 1, wherein the oval cross-sectional shape is an ellipse.

4. The female fluid coupling of claim 1, wherein the oval cross-sectional shape is egg-shaped.

5. The female fluid coupling of claim 1, wherein the oval cross-sectional shape is an oblong circle.

6. The female fluid coupling of claim 1, wherein the latch mechanism is movable between the latched and unlatched positions along a same transverse direction as which a long axis of the oval cross-sectional shape of the outer portion extends.

7. The female fluid coupling of claim 1, wherein the coupling body also defines a transition portion of the interior space located between the outer portion and an inner portion, and wherein the transition portion includes a surface that extends at a non-zero angle relative to the central longitudinal axis.

8. The female fluid coupling of claim 7, wherein the non-zero angle is between 30 degrees and 60 degrees.

9. The female fluid coupling of claim 7, wherein the portion of the latch mechanism that intersects the outer portion of the interior space while the latch mechanism is in the latched position is positioned on an opposite side of the outer portion in comparison to where the surface that extends at the non-zero angle relative to the central longitudinal axis meets the outer portion.

10. The female fluid coupling of claim 1, wherein the portion of the latch mechanism that intersects the outer portion of the interior space while the latch mechanism is in the latched position comprises a protrusion, and wherein the protrusion does not extend into the interior space while the latch mechanism is in the unlatched position.

11. The female fluid coupling of claim 10, wherein a long axis of the oval cross-sectional shape of the outer portion intersects the protrusion.

12. The female fluid coupling of claim 10, wherein the protrusion comprises plastic material.

13. The female fluid coupling of claim 12, wherein an entirety of the latch mechanism is the plastic material.

14. The female fluid coupling of claim 1, further comprising a valve disposed within the interior space.

15. The female fluid coupling of claim 14, wherein the valve is movable along the central longitudinal axis between an open configuration in which fluid can flow through the female fluid coupling and a closed configuration in which fluid cannot flow through the female fluid coupling.

16. A fluid coupling system, comprising: a male coupling defining a central longitudinal axis; and a female coupling comprising: a coupling body defining a central longitudinal axis and an interior space for receiving an end portion of the male coupling, an outer portion of the interior space having an oval cross-sectional shape; and a latch mechanism coupled to the body, the latch mechanism movable between a latched position and an unlatched position, a portion of the latch mechanism intersecting the outer portion of the interior space while the latch mechanism is in the latched position, wherein the end portion of the male coupling can be inserted into the outer portion of the interior space while the latch mechanism is in the latched position; wherein a center of the oval cross-sectional shape of the outer portion of the interior space is offset from the central longitudinal axis.

17. The fluid coupling system of claim 16, wherein farther insertion of the end portion into the interior space drives the portion of the latch mechanism out of the interior space and drives the latch mechanism toward the unlatched position.

18. The fluid coupling system of claim 16, wherein the central longitudinal axes of the male coupling and the coupling body of the female coupling are spaced apart from each other when the end portion of the male coupling is inserted into the outer portion of the interior space while the latch mechanism is in the latched position.

19. The fluid coupling system of claim 18, wherein the central longitudinal axes of the male coupling and the coupling body of the female coupling are coincident with each other when the male and female couplings are fully coupled together.

\* \* \* \* \*